Oct. 8, 1946.　　　　J. FORBRAGD　　　　2,408,976
TIRE INFLATING AND TESTING DEVICE
Filed July 6, 1944
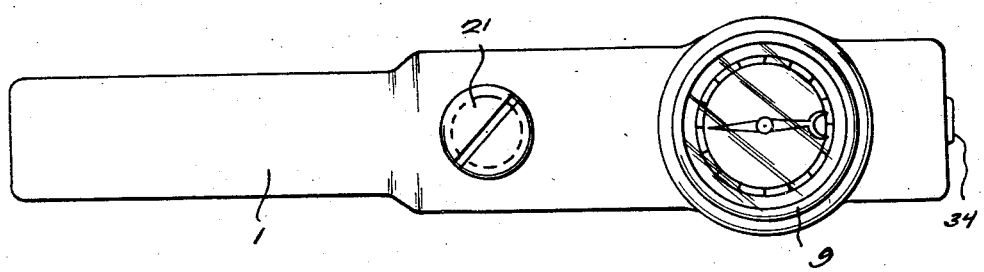
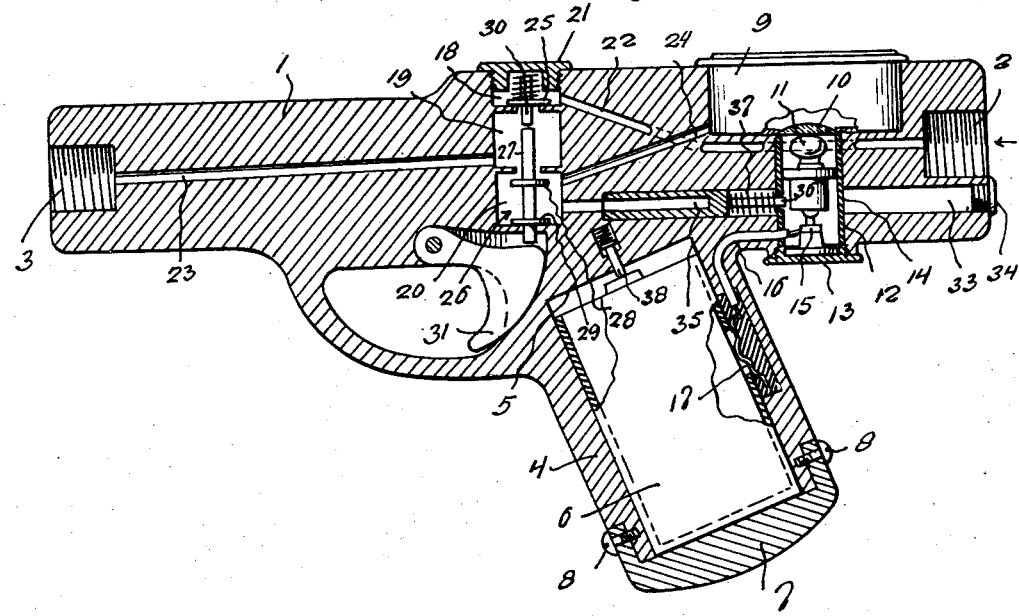
Inventor
John Forbragd.
Attorneys Patented Oct. 8, 1946

2,408,976

UNITED STATES PATENT OFFICE 2,408,976

TIRE INFLATING AND TESTING DEVICE

John Forbragd, Garden City, S. Dak.

Application July 6, 1944, Serial No. 543,662

1 Claim. (Cl. 137—69.5)

The present invention relates to new and useful improvements in pneumatic tire inflating and testing devices and has for its primary object to provide, in a manner as hereinafter set forth, a device of this character comprising unique means for automatically illuminating the gauge when a tire being inflated is tested, thus permitting the pressure to be accurately ascertained in the dark.

Other objects of the invention are to provide a pneumatic tire inflating and testing device of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of a device constructed in accordance with the present invention.

Figure 2 is a view in longitudinal section through the device.

Referring now to the drawing in detail, it will be seen that the embodiment of the invention which has been illustrated comprises an elongated barrel or body 1 of suitable metal, to the rear end of which an air hose (not shown) is to be connected at 2. The forward end of the body 1 is engageable at 3 with the usual inflating valve of a pneumatic tire. Formed integrally with the body 1 at an intermediate point is a depending pistol grip handle 4. The handle 4 is hollow to provide a chamber 5 for the reception of a removable cell 6. A cap 7 closes the lower end of the handle 4, said cap being secured in position by screws 8.

Mounted in the upper rear portion of the body 1 is an air pressure gauge 9. In the embodiment shown, the gauge 9 has mounted in its lower portion a lens 10. An electric lamp 11 is mounted in the body 1 below the gauge 9 for illuminating said gauge through the lens 10. A cylindrical chamber 12 in the body 1 accommodates the lamp 11, said chamber extending vertically in said body from the lower portion thereof to the gauge 9. A removable cap 13 closes the lower end of the chamber 12. An insulating lining 14 is provided in the chamber 12 for the lamp 11. An insulated contact 15 on the closure 13 is engaged with the usual base contact of the lamp 11. A conductor wire 16 electrically connects the contact 15 with an insulated contact 17 which is mounted in the handle 4 and which is engaged with the shell or case of the cell 6.

Formed in the upper portion of the body 1 at an intermediate point is a vertical series of communicating chambers 18, 19 and 20. A removable closure 21 for the upper chamber 18 is threadedly mounted in the body 1. The upper chamber 18 communicates with the air intake 2 of the body 1 through a passage 22. The intermediate chamber 19 communicates with the outlet 3 of the body 1 through a longitudinal passage 23. Then, the lower chamber 20 communicates with the gauge 9 for actuating same through a passage 24 in the body 1.

A spring seated valve 25 controls communication between the chambers 18 and 19. A dual valve 26 controls communication between the chambers 19 and 20. The valve 26 includes a stem 27 having fixed thereon spaced discs 28 and 29. The stem 27 is engageable endwise with the stem 30 of the valve 25 for opening said valve against the tension of its closing spring. The disc 28 is engageable with the upper end of the chamber 20 for controlling communication between said chamber and the chamber 19. The disc 29 is engageable with the lower end of the chamber 20 for preventing leakage through the opening therein which accommodates the lower end portion of the stem 27. A trigger 31 is provided for manually closing the valve 26 and opening the valve 25. A guard 32 is provided for the trigger 31.

Formed longitudinally in the lower rear portion of the body 1 is an elongated chamber 33 which communicates with the chamber 20 and which the chamber 12 intersects, said chamber 33 being closed at its rear end by a removable plug 34. Operable in the forward portion of the chamber 33 is an elongated, axially bored and substantially cup-shaped metallic piston 35. Projecting longitudinally from the closed end of the piston 35 is a metallic pin 36 which is engageable with the shell of the lamp 11 for grounding said lamp to the metallic body 1, an opening in the insulating sleeve 14 accommodating said pin. A coil spring 37 encircles the pin 36 and retracts the piston 35. A spring projected pin 38 electrically connects the cell 6 to the body 1.

It is thought that the operation of the device will be readily apparent from a consideration of the foregoing. Briefly, to inflate a pneumatic tire, the end portion 3 of the body 1 is engaged with the usual valve of said tire and the trigger 31 is actuated to close the valve 26 and open the valve 25. When this occurs air under pressure flows through the passage 22, the communicating chambers 18 and 19 and the passage 23 to the tire. When it is desired to ascertain the pressure in the tire, the trigger 31 is simply released for permitting the spring seated valve 25 to close. Air under pressure flows back from the tire through the passage 23 into the chamber 19 and enters the chamber 20. The valve 26 may be opened by gravity as well as by the pressure of the air in the chamber 19. When the member 28 of the valve 26 opens, the member 29 closes for preventing leakage around the stem 27. From the chamber 20 the air flows through the passage 24 to the gauge 9. Air from the chamber 20 also enters the chamber 33 and actuates the piston 35 against the tension of the coil spring 37 for engaging the pin 36 with the shell of the lamp 11. In this manner the electric circuit is completed and the lamp 11 is lighted for illuminating the gauge 9. When the member 28 is again closed and the member 29 is opened the air exhausts to the atmosphere from the gauge 9 and the chamber 33 past said member 29. Thus, the gauge 9 is permitted to return to zero and the piston 35 is retracted by the coil spring 37 for opening the circuit and extinguishing the lamp 11.

It is believed that the many advantages of a tire inflating and testing device constructed in accordance with the present invention will be readily understood and although a preferred embodiment of said device is as illustrated and described, it is to be understood that changes in the details of construction may be resorted to which will fall within the scope of the invention as claimed.

What is claimed is:

A pneumatic tire inflating and testing device comprising an elongated metallic body having controllable passageways including inlet and outlet passageways for connection with an air line and with a tire valve respectively, a lateral pistol grip handle extension on said body, an illuminable gauge mounted in the body and readably exposed at one side of the body, an air passageway for said gauge, said body having a transverse chamber therein adjacent said gauge, an electric lamp mounted in and insulated from the chamber walls and arranged for illuminating the gauge, an electric cell mounted in the handle extension and generally insulated from the body and having one of its electrical poles connected to one circuit terminal of the lamp, said cell having its other electrical pole connected to the body, a metallic, normally spring-pressed, air-actuated piston slidable longitudinally in the body adjacent said transverse lamp containing chamber, an air passageway for said piston, a pin on an end of said piston engageable with the other circuit terminal of the lamp for electrically connecting said lamp to the body at the will and control of the operator under pressure of air from the outlet passageway, and manually operable valve controlled means in the body common to all of the body passageways for selectively connecting the inlet passageway to the outlet passageway or for simultaneously connecting said outlet passageway to the gauge to actuate the gauge and to said piston for causing illumination of the lamp and the gauge.

JOHN FORBRAGD.